US010530913B2

(12) United States Patent
Park et al.

(10) Patent No.: US 10,530,913 B2
(45) Date of Patent: Jan. 7, 2020

(54) FLEXIBLE ELECTRONIC DEVICE

(71) Applicant: SAMSUNG ELECTRONICS CO., LTD., Suwon-si, Gyeonggi-do (KR)

(72) Inventors: Seonkeun Park, Seoul (KR); Donghun Kim, Seoul (KR); Yuguen Kim, Yongin-si (KR); Hyunkeun Son, Seoul (KR); Jinsang Hwang, Seoul (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/093,291

(22) PCT Filed: Jan. 6, 2017

(86) PCT No.: PCT/KR2017/000217
§ 371 (c)(1),
(2) Date: Oct. 12, 2018

(87) PCT Pub. No.: WO2017/179799
PCT Pub. Date: Oct. 19, 2017

(65) Prior Publication Data
US 2019/0132432 A1 May 2, 2019

(30) Foreign Application Priority Data
Apr. 12, 2016 (KR) .................. 10-2016-0045052

(51) Int. Cl.
*H04M 1/02* (2006.01)
*G06F 1/16* (2006.01)

(52) U.S. Cl.
CPC ........ *H04M 1/0268* (2013.01); *G06F 1/1652* (2013.01); *G06F 1/1681* (2013.01);
(Continued)

(58) Field of Classification Search
CPC .. H04M 1/0268; H04M 1/0216; G06F 1/1652
See application file for complete search history.

(56) References Cited

U.S. PATENT DOCUMENTS

2014/0126121 A1* 5/2014 Griffin ................ H04M 1/0216
361/679.01
2015/0077917 A1 3/2015 Song
(Continued)

FOREIGN PATENT DOCUMENTS

EP          2 960 747        12/2015
KR     10-2014-0049911         4/2014
(Continued)

OTHER PUBLICATIONS

English Translation of KR20140049911, Lee et al., Apr. 2014, "Flexible Hinge Device and Flexible Hinge Device With Flexible Display Device".*
(Continued)

*Primary Examiner* — Ayodeji O Ayotunde
(74) *Attorney, Agent, or Firm* — Nixon & Vanderhye, P.C.

(57) ABSTRACT

Various embodiments of the present invention relate to a flexible electronic device. The flexible electronic device may comprise: a flexible display; a first housing and a second housing to which the flexible display is coupled; a multi-joint hinge for connecting the first housing and the second housing to allow the electronic device to be folded; a flexible cover for covering at least a portion of the first housing, the multi-joint hinge, and at least a portion of the second housing; and a shape preservation unit for holding an appearance session of the electronic device, is the shape preservation unit which is located between the multi joint hinge and the flexible cover. In addition, various embodiments based on the technical idea of the present invention are available.

13 Claims, 6 Drawing Sheets

(52) U.S. Cl.
CPC ........... *H04M 1/0216* (2013.01); *G06F 1/163* (2013.01); *G06F 1/1616* (2013.01)

(56) References Cited

U.S. PATENT DOCUMENTS

| | | | | |
|---|---|---|---|---|
| 2015/0370287 | A1* | 12/2015 | Ko | G06F 1/1626 |
| | | | | 361/749 |
| 2016/0014919 | A1* | 1/2016 | Huitema | G06F 1/1652 |
| | | | | 313/511 |
| 2016/0299532 | A1 | 10/2016 | Gheorghiu et al. | |

FOREIGN PATENT DOCUMENTS

| | | |
|---|---|---|
| KR | 10-1467857 | 12/2014 |
| KR | 10-2015-0031602 | 3/2015 |
| KR | 10-2015-0037383 | 4/2015 |
| KR | 10-2015-0069983 | 6/2015 |
| WO | 2015/086890 | 6/2015 |

OTHER PUBLICATIONS

International Search Report for PCT/KR2017/000217, dated Apr. 14, 2017, 5 pages.
Written Opinion of the ISA for PCT/KR2017/000217, dated Apr. 14, 2017, 6 pages.
Extended European Search Report dated Mar. 13, 2019 in European Patent Application No. 17782556.9.

* cited by examiner

FLEXIBLE ELECTRONIC DEVICE

This application is the U.S. national phase of International Application No. PCT/KR2017/000217 filed 6 Jan. 2017, which designated the U.S. and claims priority to KR Patent Application No. 10-2016-0045052 filed 12 Apr. 2016, the entire contents of each of which are hereby incorporated by reference.

TECHNICAL FIELD

Various embodiments of the present disclosure relate to a flexible electronic device including a multi joint hinge.

BACKGROUND ART

Due to the remarkable development of information communication technology and semiconductor technology, the distribution and use of electronic devices are rapidly increasing. In addition, recent electronic devices are converging with various terminals without staying in the traditional unique areas thereof. For example, a mobile communication terminal may provide a TV viewing function (e.g., mobile broadcasting such as Digital Multimedia Broadcasting (DMB) or Digital Video Broadcasting (DVB)), a music reproduction function (e.g., MPEG Audio Layer-3 (MP3)), an Internet access function, and a radio reception function, in addition to general communication functions such as voice communication and message transmission/reception.

On the other hand, in recent years, interest in an electronic device including a flexible display (hereinafter, referred to as a "flexible electronic device") is increasing. However, currently, all the components included in the electronic device are not made to be flexible. Therefore, the flexible electronic device is configured to be bent at one side using a multi-joint hinge.

DISCLOSURE OF INVENTION

Technical Problem

However, the electronic device having the multi-joint hinge has a problem in that the multi joint hinge is exposed to the outside. As a result, the electronic device has a problem in that the aesthetic property deteriorates in design. In addition, in the electronic device, foreign matter may be introduced into the multi-joint hinge.

Further, when a lateral side face of the multi-joint hinge has a curved face, the multi-joint hinge may be chipped when the electronic device is folded. Therefore, the multi-joint hinge included in the electronic device should have a flat side face. Due to this, there is a limitation in the electronic device in terms of design.

Various embodiments of the present disclosure are able to provide a flexible electronic device that is able to prevent the exposure of a multi joint hinge and may have a curved side face.

Solution to Problem

A flexible electronic device according to various embodiments of the present disclosure may include: a flexible display; a first housing and a second housing to which the flexible display is coupled; a multi joint hinge configured to connect the first housing and the second housing so as to make the electronic device foldable; a flexible cover configured to cover at least a portion of the first housing, the multi-joint hinge, and at least a portion of the second housing; and a shape-retaining unit located between the multi-joint hinge and the flexible cover and configured to maintain an appearance session of the electronic device.

Advantageous Effects of Invention

As described above, various embodiments of the present disclosure are able to prevent external exposure of a multi-joint hinge. Thus, various embodiments of the present disclosure are able to improve the aesthetic property of electronic devices in design. In addition, various embodiments of the present disclosure are able to prevent foreign matter from infiltrating into the multi joint hinge, thereby improving the reliability of the electronic device. In addition, various embodiments of the present disclosure are able to be free of constraints in design of a side face of an electronic device.

BEST MODE FOR CARRYING OUT THE INVENTION

Figure 1:
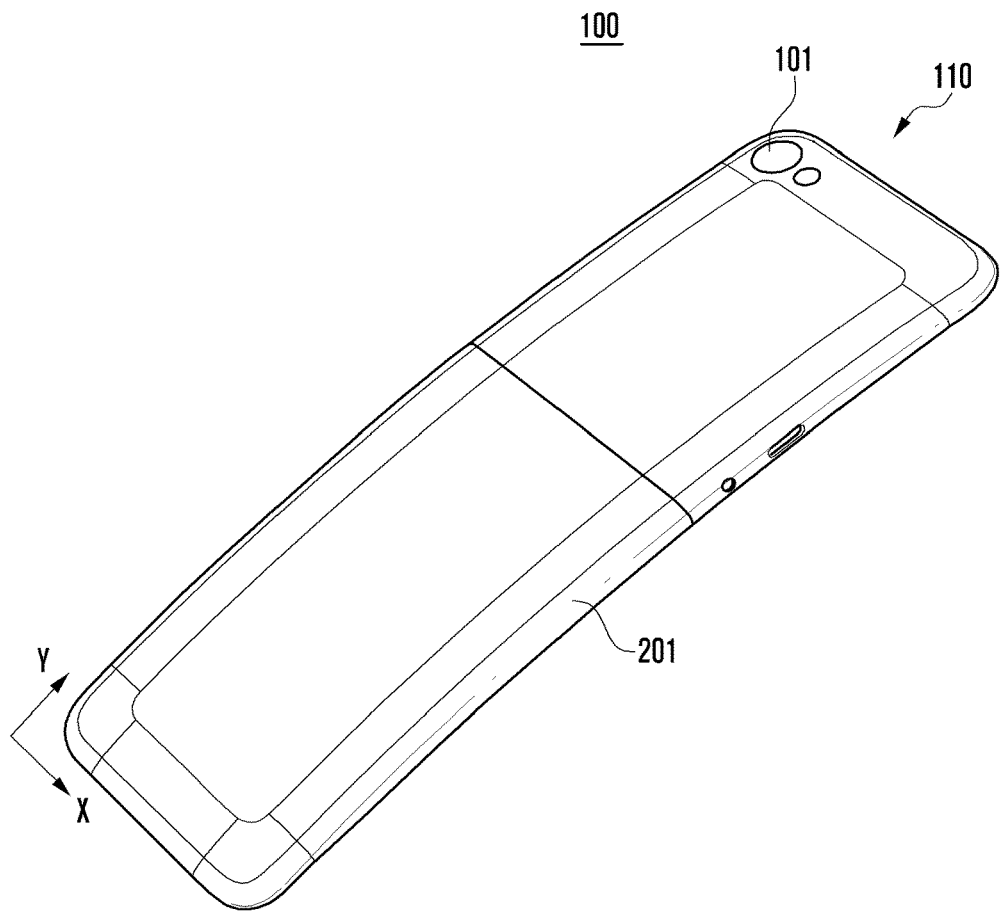
FIG. 1 is a view illustrating an electronic device according to an embodiment of the present disclosure.
Figure 1:
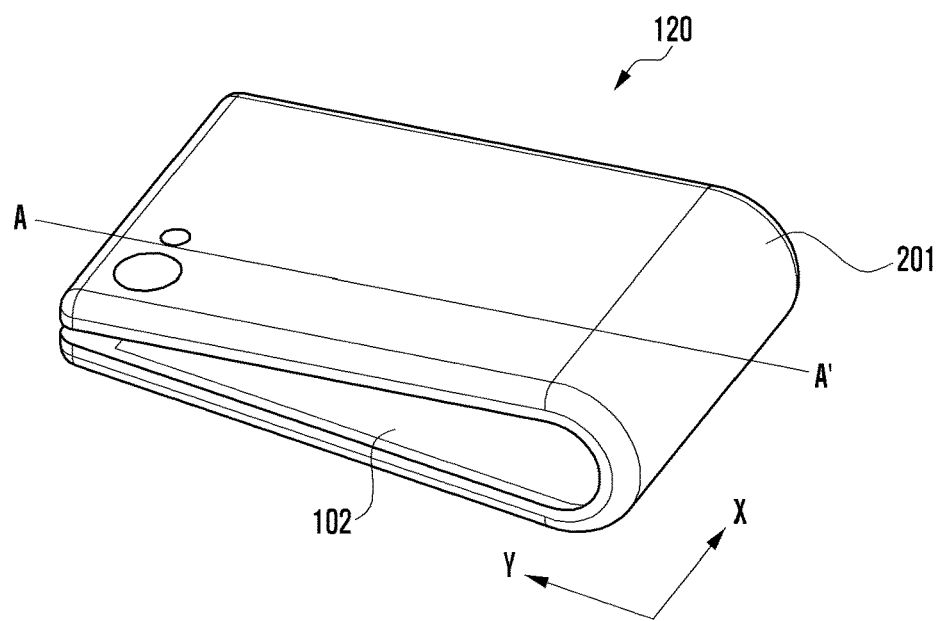

Hereinafter, various embodiments of this document will be described with reference to the accompanying drawings. However, it should be understood that technology described in this document is not limited to a specific embodiment and includes various modifications, equivalents, and/or alternatives of an embodiment of this document. The same reference numbers are used throughout the drawings to refer to the same or like parts. In this document, an expression such as "A or B", "at least one of A or/and B", or "one or more of A or/and B" may include all possible combinations of together listed items. An expression such as "first" and "second" used in this document may indicate various constituent elements regardless of order and/or importance, is used for distinguishing a constituent element from another constituent element, and does not limit corresponding constituent elements. When it is described that a constituent element (e.g., a first constituent element) is "(operatively or communicatively) coupled with/to" or is "connected to" another constituent element (e.g., a second constituent element), it should be understood that the constituent element may be directly connected to the another constituent element or may be connected to the another constituent element through another constituent element (e.g., a third constituent element).

An expression "configured to" used in this document may be interchangeably used with, for example, "suitable for", "having the capacity to", "designed to", "adapted to", "made to", or "capable of" according to a situation. A term "configured to" does not always mean "specifically designed to" in hardware. Alternatively, in any situation, an expression "device configured to" may mean that the device is "capable of" being configured together with another device or component. For example, a "processor configured to perform phrases A, B, and C" may be a generic-purpose processor (e.g., CPU or application processor) that executes an exclusive processor (e.g., an embedded processor) for performing a corresponding operation or at least one software program stored at a memory device to perform a corresponding operation.

An electronic device according to various exemplary embodiments of the present invention may be a device including a communication function. For example, the electronic device may include at least one of a smart phone, tablet personal computer (PC), mobile phone, video phone, e-book reader, desktop PC, laptop PC, netbook computer, personal digital assistant (PDA), portable multimedia player (PMP), MPEG 3 (MP3) player, mobile medical equipment, camera, wearable device (e.g., head-mounted-device (HMD) such as electronic glasses), electronic clothing, electronic bracelet, electronic necklace, electronic accessory, electronic tattoo, and smart watch. [49] In any embodiment, the electronic device may be a smart home appliance. The smart home appliance may include at least one of, for example, a television, digital video disk (DVD) player, audio device, refrigerator, air-conditioner, cleaner, oven, microwave oven, washing machine, air cleaner, set-top box, home automation control panel, security control panel, television box (e.g., Samsung HomeSync™, AppleTV™, or Google TV™), game console (e.g., Xbox™, PlayStation™), electronic dictionary, electronic key, camcorder, and electronic frame.

In another embodiment, an electronic device may include at least one of various medical devices (e.g., various portable medical measurement devices (blood sugar measurement device, heartbeat measurement device, blood pressure measurement device, or body temperature measurement device), magnetic resonance angiography (MRA) device, magnetic resonance imaging (MRI) device, computed tomography (CT) device, scanning machine, and ultrasonic wave device), navigation device, global positioning system (GPS) receiver, event data recorder (EDR), flight data recorder (FDR), vehicle infotainment device, ship electronic equipment (e.g., ship navigation device, gyro compass), avionics, security device, vehicle head unit, industrial or home robot, automatic teller's machine (ATM) of a financial institution, point of sales (POS) of a store, and Internet of things (e.g., bulb, various sensors, electricity or gas meter, sprinkler, fire alarm, thermostat, street light, toaster, exercise mechanism, hot water tank, heater, boiler). According to any embodiment, the electronic device may include at least one of a portion of furniture or a building/structure, electronic board, electronic signature receiving device, projector, and various measurement devices (e.g., water supply, electricity, gas, or electric wave measurement device). In various embodiments, the electronic device may be a combination of one or more of the foregoing various devices. An electronic device according to any embodiment may be a flexible electronic device. Further, the electronic device according to an embodiment of this document is not limited to the foregoing devices and may include a new electronic device according to technology development. The term 'user' used in various embodiments may include a person who uses an electronic device or an apparatus (e.g., an artificial intelligence electronic device) that uses an electronic device.

Hereinafter, for convenience of explanation, the case where an electronic device according to various embodiments of the present disclosure is a smart phone will be described as an example. Further, the case where the electronic device is of a bar type will be described as an example. However, the embodiments of the present disclosure are not limited thereto. For example, the electronic device may be of a folder type or a slide type. In addition, the electronic device may be of a built-in battery type in which the battery is built in the housing or a detachable battery type in which the battery is detachable from the housing.

FIG. 1 is a view illustrating an electronic device according to an embodiment of the present disclosure.

Referring to FIG. 1, an electronic device 100 according to various embodiments of the present disclosure is foldable at one side thereof. For example, the electronic device 100 is foldable around an X-axis in the transverse direction at an intermediate portion in the longitudinal (Y-axis) direction, as illustrated in the drawing denoted by reference numeral 120 in FIG. 1. For this purpose, the electronic device 100 may have a display unit 102, which is formed of a flexible display. In addition, the folded portion of the electronic device 100 may be formed by a multi-joint hinge (not illustrated).

The multi-joint hinge according to various embodiments of the present disclosure may be covered by a flexible cover 201 of the electronic device 100 so as not to be exposed to the outside. Accordingly, the various embodiments of the present disclosure are able to prevent foreign matter from infiltrating into the multi-joint hinge.

The flexible cover 201 may be formed of a flexible and excellently resilient cloth material such as lycra, creora, or knit, or a soft material such as silicon or rubber. According to an embodiment, the flexible cover 201 may be formed of a rigid material (e.g., a metal) having a structure that can be structurally extended or contracted like a chain structure.

According to an embodiment of the present disclosure, the electronic device 100 may include a curved rear face (back face) on which a camera 101 is located. For example, as illustrated in the drawing denoted by reference numeral 110 in FIG. 1, the rear face of the electronic device 100 may make the thickness of the electronic device 100 thinner toward the upper and lower sides from the middle portion in the longitudinal (Y-axis) direction. Similarly, the rear face of the electronic device 100 may make the electronic device 100 thinner toward the left and right sides from in the middle portion in the transverse (X-axis) direction. In addition, the electronic device 100 according to the embodiment of the present disclosure may have a curved side face. As described above, the electronic device 100 according to the embodiment of the present disclosure is able to solve a problem caused since it is necessary to form the side face thereof in a flat shape due to the use of the multi-joint hinge. This will be described in detail later with reference to FIGS. 2 to 4.

Meanwhile, the electronic device 100 shown in FIG. 1 is merely an example, and the embodiment of the present disclosure is not limited thereto. For example, although the electronic device 100 is illustrated in FIG. 1 as being folded at one location in the middle portion around the transverse axis (X-axis), the electronic device 100 may be folded at various locations (e.g., in the upper and lower portions). Further, according to some embodiments, the electronic device 100 may be folded at various locations in the longitudinal (Y-axis) direction. Further, according to some embodiments, the electronic device 100 may be folded at two or more locations.

Figure 2:
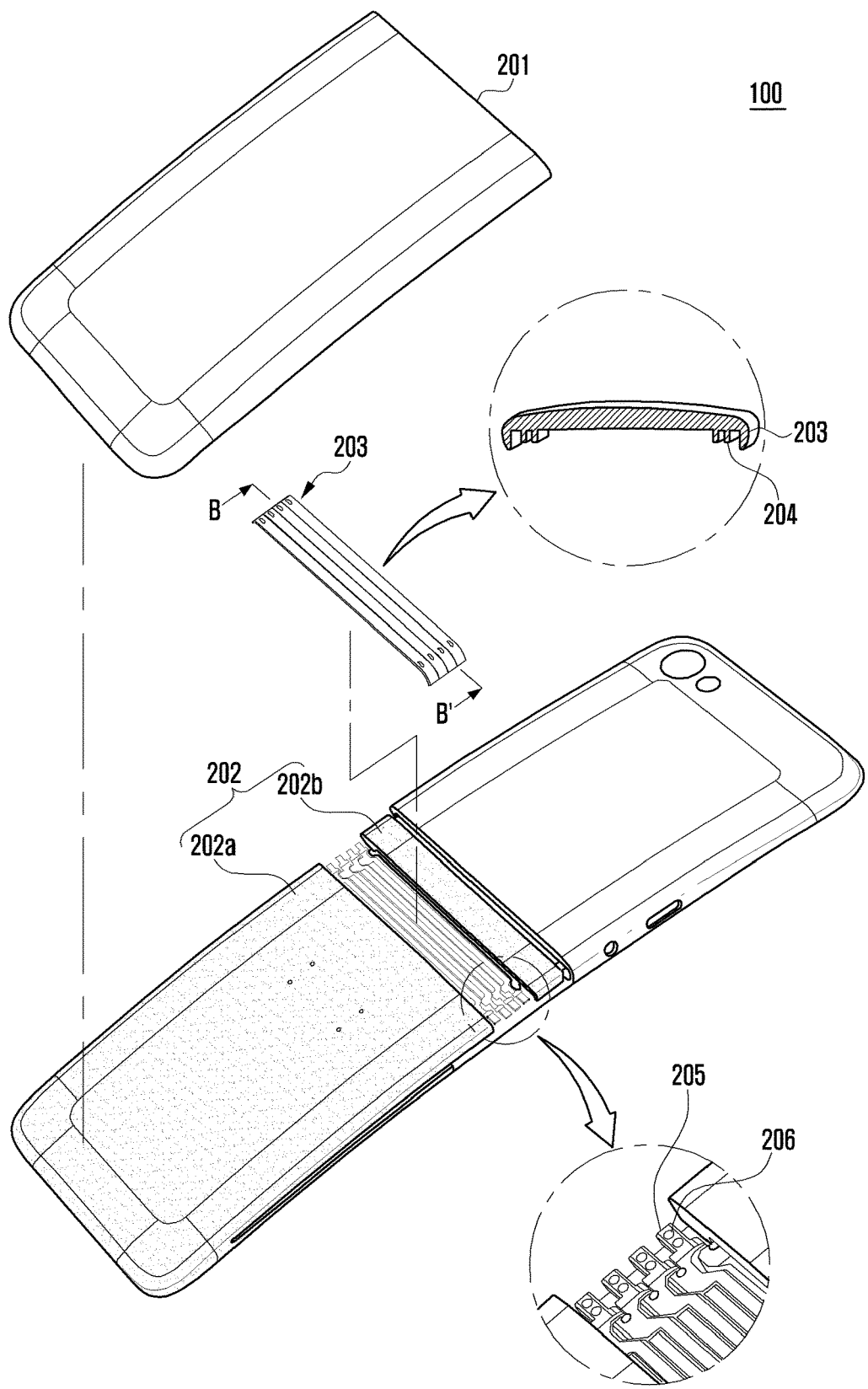
FIG. 2 is a view illustrating the electronic device according to the embodiments of the present disclosure in the state in which some components are separated.
Figure 3:
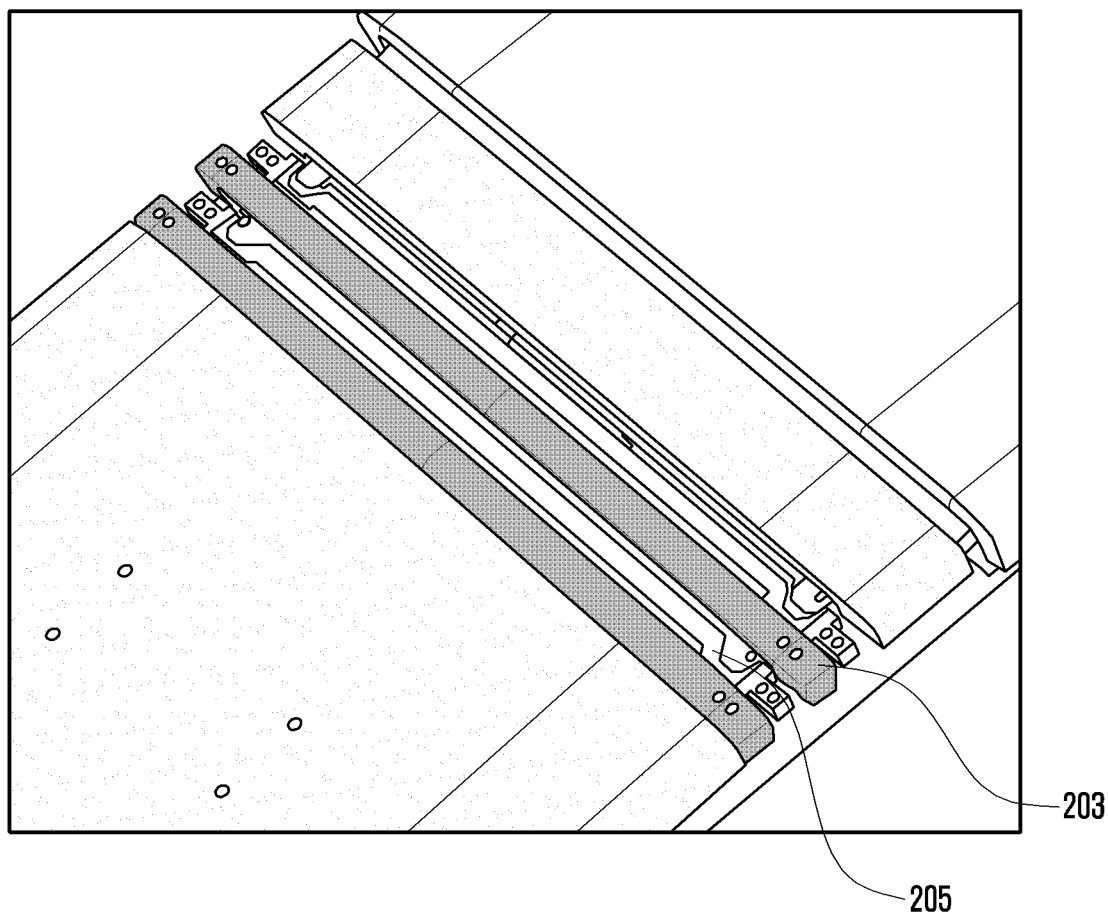
FIG. 3 is a view illustrating the state in which shape-retaining units and a multi joint hinge according to an embodiment of the present disclosure are fastened to each other.
Figure 4:
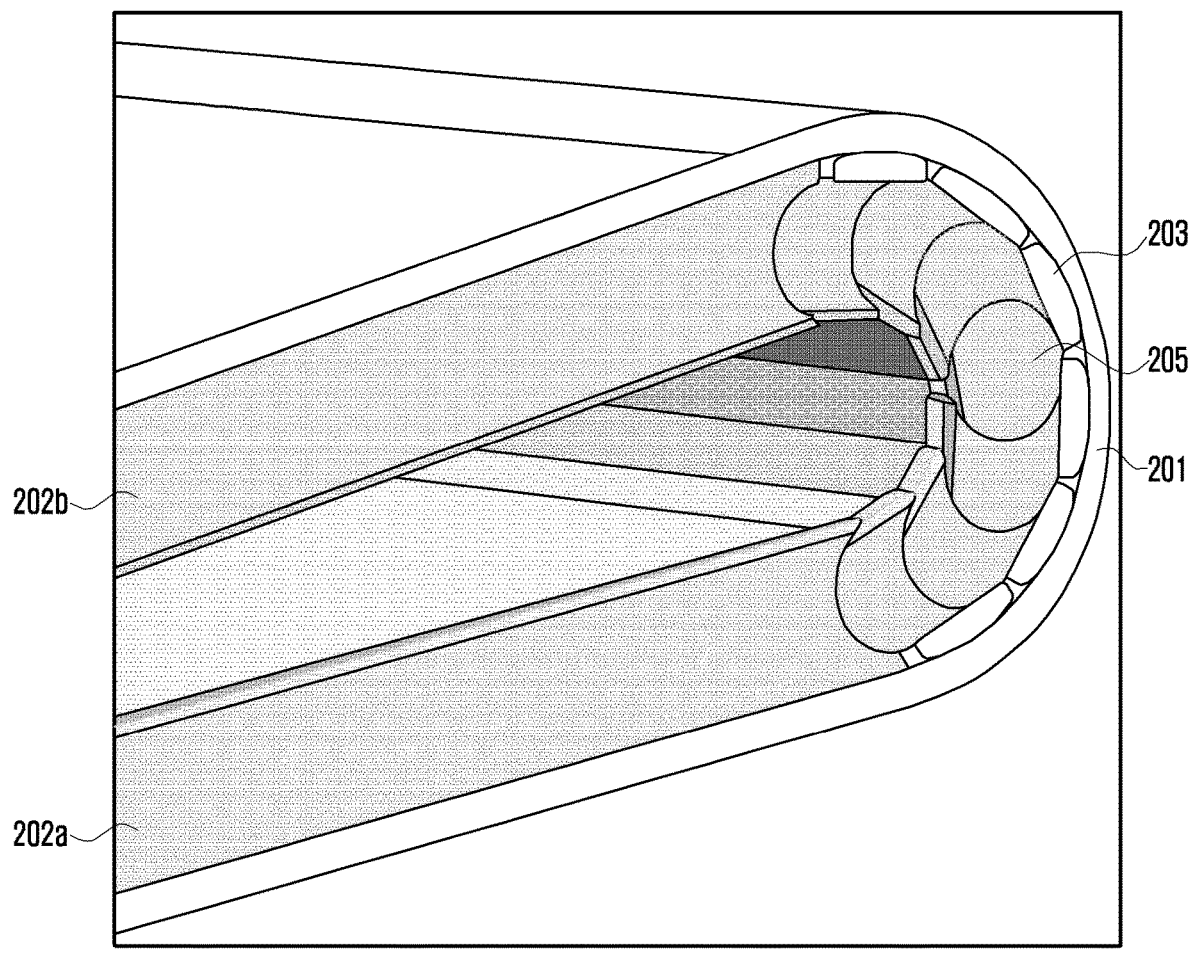
FIG. 4 is a cross-sectional view taken along line A-A' in FIG. 1.

FIG. 2 is a view illustrating the electronic device according to the embodiments of the present disclosure in the state in which some components are separated, FIG. 3 is a view illustrating the state in which shape-retaining units and a multi joint hinge according to an embodiment of the present disclosure are fastened to each other, and FIG. 4 is a cross-sectional view taken along line A-A' in FIG. 1.

Referring to FIGS. 2 and 4, the electronic device 100 according to the embodiment of the present disclosure may include a flexible cover 201, a housing 202, a shape-retaining unit 203, and a multi-joint hinge 205.

The flexible cover 201 may cover at least a folded portion of the electronic device 100. For example, the flexible cover 201 may cover at least a portion of the housing 202 and the shape-retaining unit 203. The flexible cover 201 may be formed of a flexible and stretchable material that can be extended and contracted. For example, the flexible cover 201 may be formed of silicone, rubber, flexible polyurethane, or the like. According to some embodiments, the flexible cover 201 may be formed of a flexible and excellently resilient cloth material such as lycra, creora, knit, or the like. Meanwhile, according to some embodiments, the flexible cover 201 may be formed of a material (e.g., a metal) having a structure that can be extended or contracted like a chain structure.

The housing 202 may include a first housing 202a and a second housing 202b. The housing 202 may be formed of a rigid material. For example, the housing 202 may be formed of an injection-molded article of plastic such as polycarbonate, polyamide, or the like, or a metal material such as aluminum. The first housing 202a and the second housing 202b may be respectively configured as a front housing and a rear housing.

The shape-retaining unit 203 may be located between the flexible cover 201 and the multi joint hinge 205. The shape-retaining unit 203 may be formed of a rigid material (e.g., a metal or an injection molded article). There may be provided a plurality of shape-retaining units 203 to correspond to the number of joints of the multi-joint hinge 205. For example, as illustrated in FIG. 3, one shape-retaining unit 203 may be fastened to each joint of the multi-joint hinge 205. For this purpose, the shape-retaining unit 203 may include at least one protrusion 204 fitted into at least one hole 206 formed at one side of the multi joint hinge 205.

The shape-retaining unit 203 may have a curved upper end face of the beam 203 curved according to the shape of the rear face of the electronic device 100. In addition, the shape-retaining unit 203 may have curved side faces. The shape-retaining units 203 are able to support the flexible cover 201 so as to maintain the design sections of the rear face and the side faces of the electronic device 100. For example, even if the electronic device 100 is folded, the shape-retaining units 203 are able to support the flexible cover 201 so as to maintain the design sections of the electronic device 100, as illustrated in FIG. 4. Here, when the electronic device 100 is folded, a slight gap may be formed between respective shape-retaining units 203, but the design sections of the electronic device 100 can be maintained.

The multi-joint hinge 205 is a mechanical device that allows the electronic device 100 to be folded. The multi-joint hinge 205 may include fastening portions 206 at the opposite ends thereof so as to fasten the shape-retaining units 203. The fastening portions 206 may include one or more holes into which the protrusions 204 of the shape-retaining units 203 are inserted.

Meanwhile, FIG. 2 illustrates that the shape-retaining units 203 are fastened in such a manner that the protrusions 204 of the shape-retaining units 203 are inserted (press-fitted) into the holes in the fastening portions 206 of the multi-joint hinge 205. However, the embodiments of the present disclosure are not limited thereto. For example, the shape-retaining units 203 may be fastened to the multi-joint hinge 205 through various fastening methods known in the art.

Although FIG. 2 illustrates that the flexible cover 201 partially covers the first housing 202a, the shape-retaining units 203, and the second housing 202b, the embodiments of the present disclosure is not limited thereto. For example, the flexible cover 201 may cover the entire rear face (of the first housing 202a, the shape-retaining units 203, and the second housing 202b) of the electronic device 100. Alternatively, the flexible cover 201 may cover a portion of the first housing 202a, the shape-retaining units 203, and a portion of the second housing 202b. Alternatively, the flexible cover 201 may cover a portion of the first housing 202a, the shape-retaining units 203, and the second housing 202b.

The flexible cover 201 may be integrally formed with the housing 202. For example, the flexible cover 201 may be bonded to the housing 202 through double-sided tape, adhesive, or the like.

Figure 5:
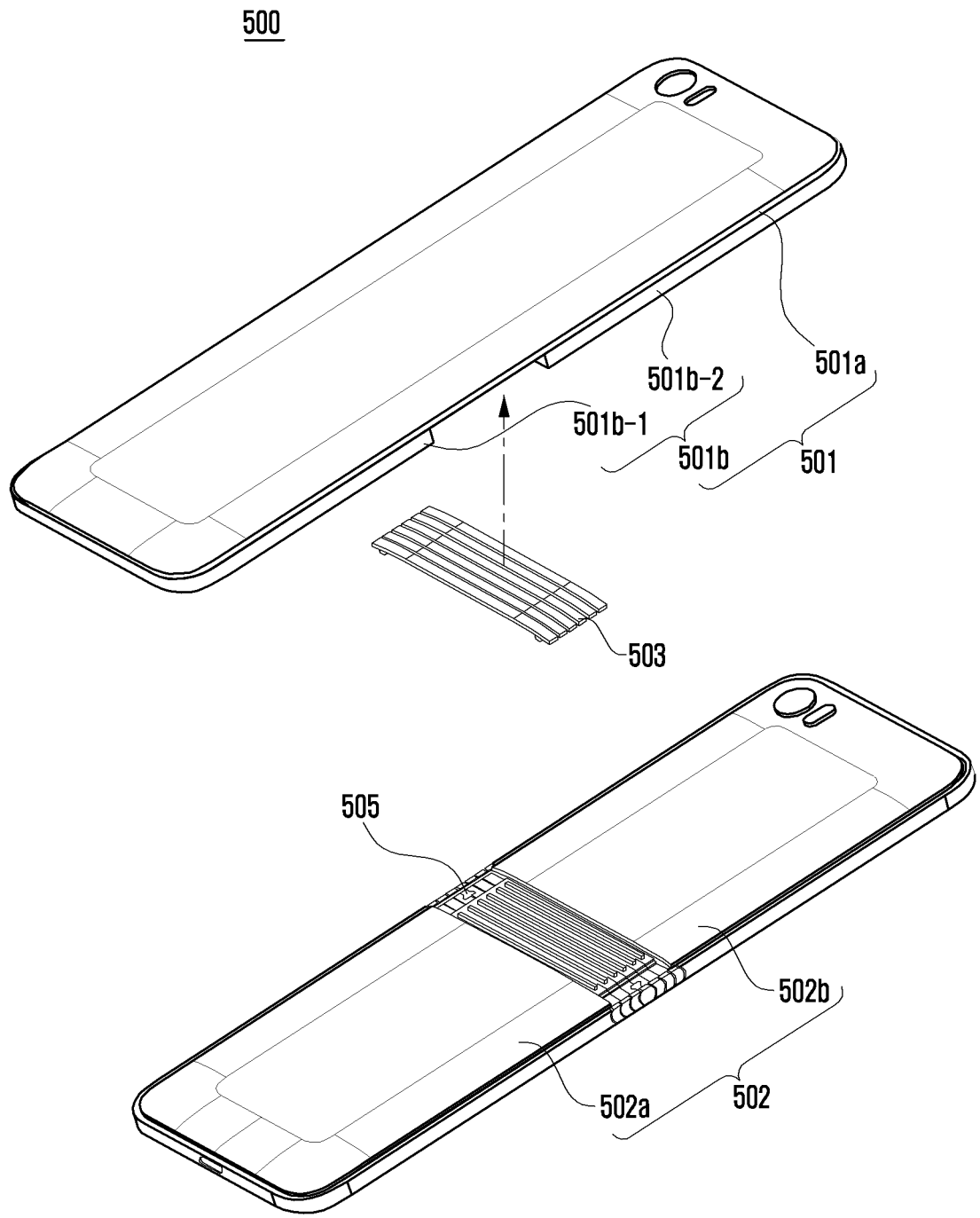
FIG. 5 is a view illustrating an electronic device according to an embodiment of the present disclosure.

FIG. 5 is a view illustrating an electronic device according to an embodiment of the present disclosure.

Referring to FIG. 5, an electronic device 500 according to an embodiment of the present disclosure may have a flexible cover, which is formed in a battery cover type. For example, the battery cover-type flexible cover 501 may include a soft portion 501a and a rigid portion 501b. The soft portion 501a may have the same configuration as the flexible cover 201 in FIGS. 2 to 4. In other words, the battery cover-type flexible cover 501 may be in the form in which the rigid portion 501b is attached (bonded) to the lower end of the flexible cover 201 in FIGS. 2 to 4.

The soft portion 510a may be formed of a soft material such as lycra, creora, knit, or the like.

The rigid portion 501b may be formed of a rigid material (e.g., an injection-molded article or a metal) so as to maintain the external appearance. The rigid portion 501b may include a first rigid portion 501b-1 corresponding to the first housing 502a and a second rigid portion 501b-2 corresponding to the second housing 502b. Shape-retaining units 503 may be positioned between the first rigid portion 501b-1 and the second rigid portion 501b-2. The shape-retaining units 503 may be bonded to the soft portion 501a.

The flexible cover 501 may be mounted on the housing 502. For example, the first rigid portion 501b-1 may be fastened to the first housing 502a, the second rigid portion 501b-2 may be fastened to the first housing 502b, and the shape-retaining units 503 may be fastened to the multi joint hinge 505. The first rigid portion 501b-1 and the second rigid portion 501b-2 may be fastened using a groove-protrusion method. The shape-retaining units 503 may be fastened to the multi-joint hinge using magnetic force, Velcro fasteners, or snap buttons.

As described above, according to one embodiment of the present disclosure, the flexible cover 501 may be formed in a battery cover type to be replaceable according to a user's taste. In addition, an embodiment of the present disclosure is also applicable to a battery-replaceable electronic device.

Figure 6:
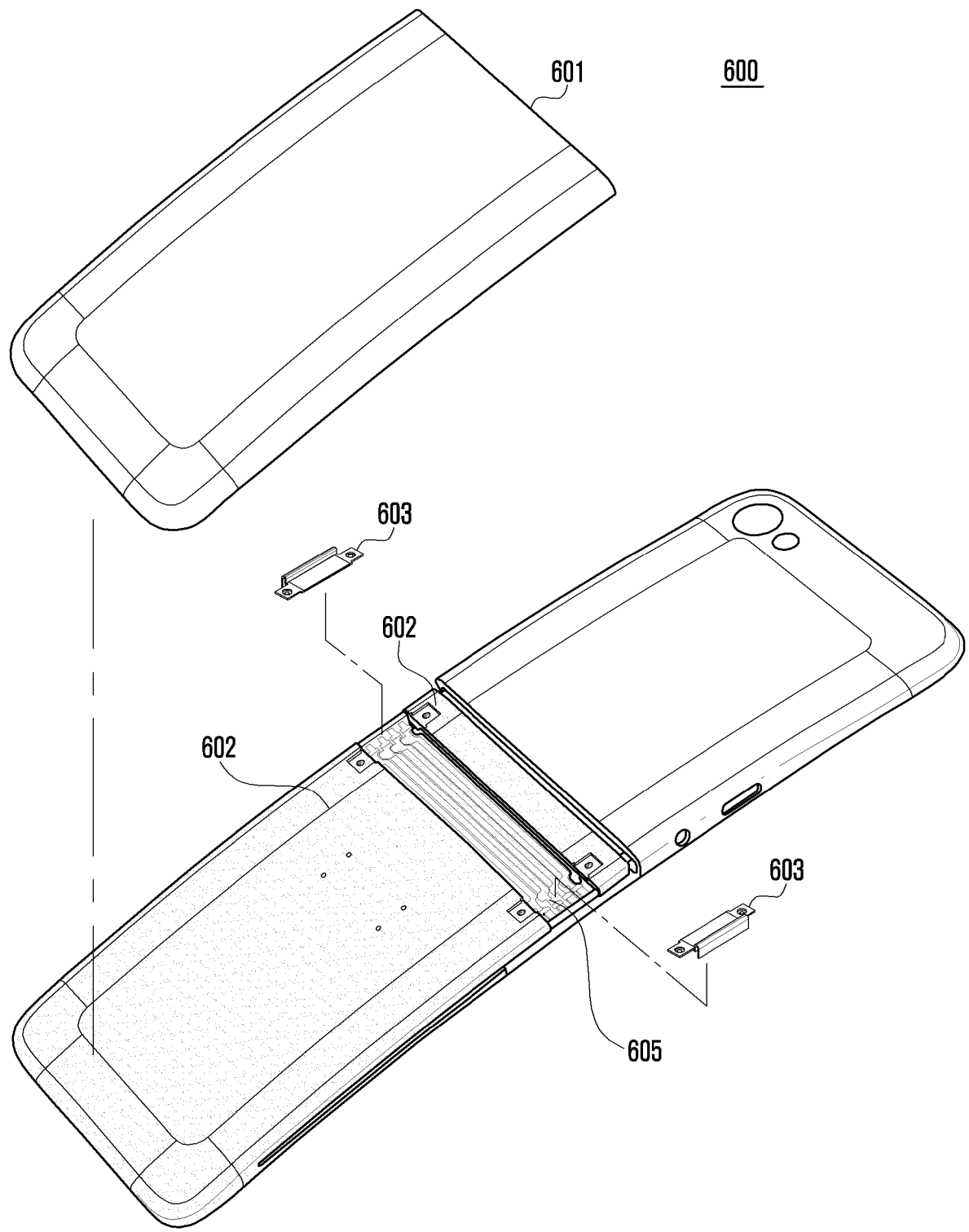
FIG. 6 is a view illustrating an electronic device according to an embodiment of the present disclosure.

FIG. 6 is a view illustrating an electronic device according to an embodiment of the present disclosure.

Referring to FIG. 6, an electronic device 600 according to various embodiments of the present disclosure includes two shape-retaining units 603, each of which covers a portion of one side end of the multi joint hinge 605 and one side face of the electronic device 600. The two shape-retaining units 603 may be provided so as to be respectively located at the opposite sides of the electronic device 600. The shape-retaining units 603 may be fastened to the housing 602. For example, the shape-retaining units 603 may be fastened to the housing 602 through screws. The shape-retaining units 603 may be formed in various shapes (e.g., a curved shape) according to the side face design of the electronic device 600. Thus, the electronic device 600 according to the embodiment of the present disclosure is able to solve constraints in design.

Since the shape-retaining units 603 are fastened to the housing 602, the multi joint hinge 605 does not include a fastening portion for fastening the shape-retaining units 603. The upper end face of the multi-joint hinge 605 may be formed to correspond to the rear face design of the electronic device 600. For example, the upper end face of the multi-joint hinge 605 may have a height and a curved face that are the same as (or similar to) those of the upper end face of the housing 602. That is, the upper end face of the multi-joint hinge 605 is in contact with the flexible cover 601 to support the flexible cover 601. Here, the electronic device 600 of FIG. 6 is similar to the electronic device 100 of FIG. 2 described above, and thus a detailed description thereof is omitted.

The term "module" used in the present disclosure may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present disclosure may include at least one of an Application-Specific Integrated Circuit (ASIC) chip, a Field-Programmable Gate Array (FPGA), and a programmable-logic device for performing certain operations which have been known or are to be developed in the future. The computer-readable storage media may include magnetic media such as a hard disk, floppy disk, and magnetic tape, optical media such as a Compact Disc Read Only memory (CD-ROM) and a Digital Versatile Disc (DVD), magneto-optical media such as a floptical disk, and a hardware device, specially formed to store and perform a program instruction (e.g., a programming module), such as a Read Only memory (ROM), a Random Access memory (RAM), a flash memory. Further, a program instruction may include a high-level language code that may be executed by a computer using an interpreter as well as a machine language code generated by a compiler. In order to perform operation of the present disclosure, the above-described hardware device may be formed to operate as at least one software module, and vice versa.

The invention claimed is:

1. A flexible electronic device comprising:
a first housing and a second housing;
a flexible display coupled to the first housing and the second housing;
a multi-joint hinge connected between the first housing and the second housing and configured to allow folding of the electronic device;
a flexible cover configured to cover at least a portion of the first housing, the multi-joint hinge, and at least a portion of the second housing to thereby cover at least a portion of a rear face of the electronic device opposite a front face comprising the flexible display; and
a shape-retaining unit disposed between the multi joint hinge and the flexible cover, the shape-retaining unit comprising one or more rigid beam members each having an upper face configured according to a shape of the rear face of the electronic device to thereby support the flexible cover when the electronic device is folded to maintain a designed appearance of the folded electronic device.

2. The electronic device of claim 1, wherein the multi-joint hinge includes a fastening portion configured to fasten the shape-retaining unit thereto.

3. The electronic device of claim 1, wherein the shape-retaining unit includes the upper face and a side face, at least one of which is curved.

4. The electronic device of claim 1, wherein the first housing and the second housing comprise a rigid material, and
the flexible cover comprises a soft material.

5. The electronic device of claim 4, wherein the flexible cover comprises lycra, creora, knit, silicon, rubber or flexible urethane.

6. The electronic device of claim 5, wherein the flexible cover is stretchable.

7. The electronic device of claim 1, wherein the shape-retaining insert comprises a plurality of beam members, and
each of the beam members covers one side end of the multi-joint hinge and the rear face of the electronic device.

8. The electronic device of claim 7, wherein each of the plurality of beam members is fastened to the first and second housings.

9. The electronic device of claim 1, wherein the flexible cover is configured to cover a battery of the electronic device.

10. The electronic device of claim 9, wherein the flexible cover further includes a rigid portion.

11. The electronic device of claim 10, wherein the rigid portion includes a first rigid portion fastened to the first housing and a second rigid portion fastened to the second housing.

12. The electronic device of claim 11, wherein the one or more rigid beam members are located between the first rigid portion and the second rigid portion and are bonded to the flexible cover.

13. The electronic device of claim 12, wherein the one or more rigid beam members are fastened to the multi-joint hinge using a magnetic force, a Velcro fastener, or a snap button.

* * * * *